US010245694B2

(12) United States Patent
Komatsu et al.

(10) Patent No.: US 10,245,694 B2
(45) Date of Patent: Apr. 2, 2019

(54) DRY MACHINING APPARATUS

(71) Applicant: Mitsubishi Heavy Industries Machine Tool Co., Ltd., Ritto-shi, Shiga (JP)

(72) Inventors: Yoshinao Komatsu, Tokyo (JP); Hirohisa Ichihata, Tokyo (JP); Kazuyuki Ishizu, Tokyo (JP)

(73) Assignee: Mitsubishi Heavy Industries Machine Tool Co., Ltd., Ritto-shi, Shiga (JP)

( * ) Notice: Subject to any disclaimer, the term of this patent is extended or adjusted under 35 U.S.C. 154(b) by 37 days.

(21) Appl. No.: 15/531,941

(22) PCT Filed: Nov. 19, 2015

(86) PCT No.: PCT/JP2015/082574
§ 371 (c)(1),
(2) Date: May 31, 2017

(87) PCT Pub. No.: WO2016/088567
PCT Pub. Date: Jun. 9, 2016

(65) Prior Publication Data
US 2018/0257190 A1    Sep. 13, 2018

(30) Foreign Application Priority Data
Dec. 3, 2014    (JP) .................. 2014-245342

(51) Int. Cl.
*B23Q 11/00*    (2006.01)
*B23Q 11/12*    (2006.01)

(52) U.S. Cl.
CPC .......... *B23Q 11/005* (2013.01); *B23Q 11/122* (2013.01); *Y02P 70/171* (2015.11)

(58) Field of Classification Search
CPC .. B23Q 11/005; B23Q 11/006; B23Q 11/0042
See application file for complete search history.

(56) References Cited

U.S. PATENT DOCUMENTS

| 4,986,703 A * | 1/1991 | Hampl ................. B23Q 11/006 144/252.1 |
| 6,821,062 B2 * | 11/2004 | Hockauf .................. B23Q 1/01 144/252.1 |
| 2010/0293739 A1 | 11/2010 | Imamura et al. |

FOREIGN PATENT DOCUMENTS

| CN | 201338142 Y | 11/2009 |
| CN | 101848789 A | 9/2010 |

(Continued)

OTHER PUBLICATIONS

Written Opinion and International Search Report dated Jan. 12, 2016 in PCT Application No. PCT/JP2015/082574 with an English Translation.

(Continued)

*Primary Examiner* — Daniel Howell
(74) *Attorney, Agent, or Firm* — Birch, Stewart, Kolasch & Birch, LLP

(57) ABSTRACT

A dry machining apparatus includes: a tool that machine a workpiece; a first surface that is arranged below the tool and receives chips generated by the machining; a second surface that is arranged upper than the first surface; a third surface that connects the first surface and the second surface; and an air jet nozzle that has an air jet port which jets air toward a boundary portion between the second surface and the third surface from the second surface, and the air jet nozzle supplies at least a part of the air jetted from the air jet port to the first surface.

14 Claims, 13 Drawing Sheets

(56) References Cited

FOREIGN PATENT DOCUMENTS

| | | | | |
|---|---|---|---|---|
| CN | 203448712 U | | 9/2010 | |
| DE | 19734628 A1 | * | 2/1999 | ............... B08B 5/02 |
| DE | 102004013859 A1 | * | 10/2004 | ........... B23Q 11/006 |
| DE | 20 2013 008 915 U1 | | 12/2013 | |
| EP | 0 855 245 A1 | | 7/1998 | |
| JP | 10034484 A | * | 2/1998 | |
| JP | 11291108 A | * | 10/1999 | |
| JP | 2001-87945 A | | 4/2001 | |
| JP | 2001322048 A | * | 11/2001 | ............. B23Q 11/00 |
| JP | 2002-36040 A | | 2/2002 | |
| JP | 2002-346876 A | | 12/2002 | |
| SU | 1014686 A1 | * | 4/1983 | ......... B23Q 11/0046 |

OTHER PUBLICATIONS

Chinese Office Action dated Jul. 16, 2018 in corresponding Chinese Application No. 201580065530.7 with an English Translation.

* cited by examiner

DRY MACHINING APPARATUS

FIELD

The present invention relates to a dry machining apparatus.

BACKGROUND

When a workpiece is machined by a tool, chips are generated. In dry machining without use of cutting oils, chips are removed or collected by use of air. In Patent Literature 1, a technique for removing chips from a hob by use of air is disclosed. In Patent Literature 2, a technique for increasing recovery efficiency of chips by use of air is disclosed.

CITATION LIST

Patent Literature

Patent Literature 1: Japanese Unexamined Patent Application, Publication No. 2001-087945
Patent Literature 2: Japanese Unexamined Patent Application, Publication No. 2002-346876

SUMMARY

Technical Problem

Chips generated in dry machining fall on a receiving surface, such as a floor surface. When the chips fallen on the receiving surface are left unattended, the chips are accumulated there and may influence the operation of the dry machining apparatus. Thus, there is a need to remove the chips fallen on the receiving surface and to prevent the accumulation of the chips on the receiving surface.

Although cutting oils are not used in dry machining apparatuses, lubricating oils for lubricating their driving units are used. Therefore, oil droplets or oil films due to the lubricating oils may be present on the receiving surfaces. When oil droplets or an oil film are/is present on a receiving surface, adhesion force between the chips and the receiving surface is increased, and it may become difficult for the chips to be removed smoothly from the receiving surface.

An object of an aspect of the present invention is to provide a dry machining apparatus that enables chips to be smoothly removed from a receiving surface.

Solution to Problem

According to the first aspect of the present invention, a dry machining apparatus is provided which comprises: a tool that machines a workpiece; a first surface that is arranged below the tool and receives chips generated by the machining; a second surface that is arranged upper than the first surface; a third surface that connects the first surface and the second surface; and an air jet nozzle that has an air jet port which jets air toward a boundary portion between the second surface and the second surface from the second surface, and the air jet nozzle supplies at least a part of the air jetted from the air jet port to the first surface.

According to the first aspect of the present invention, the chips generated by the machining fall on the first surface. The second surface is arranged upper than the first surface, and a level difference is provided between the first surface and the second surface. When air is jetted from an air jet port to at least a part of the second surface, that air flows toward the first surface from the second surface. The air is separated at the second surface, or the boundary portion between the second surface and the third surface. The air that has separated at the second surface or the boundary portion between the second surface and the third surface flows so as to be drawn toward the first surface, due to the Coanda effect. The air that has been drawn toward the first surface due to the Coanda effect becomes difficult to be separated from the first surface. Therefore, diffusion or damping of the air on the first surface is reduced. By the air flowing on the first surface in the state where the diffusion or damping has been reduced, the chips on the first surface are smoothly removed by that air. Further, since the chips are efficiently removed, even if the flow rate of the air jetted from the air jet port is reduced, the chips are removed smoothly.

In the first aspect of the present invention, a dimension of the air jet port relative to a horizontal direction parallel to the first surface may be larger than a dimension of the air jet port relative a vertical direction.

Thereby, the Coanda effect is obtained over a wide range of the first surface, and the chips are removed over a wide range of the first surface.

In the first aspect of the present invention, the dry machining apparatus may have a convex portion provided at the boundary portion; a concave portion provided at the boundary portion; or both a convex portion and a concave portion provided at the boundary portion.

Thereby, a longitudinal vortex is generated in the air that has passed the boundary portion. Since the longitudinal vortex is difficult to be damped, the air that has passed the boundary portion is able to reach a long distance while maintaining kinetic energy sufficient for removal of the chips. Therefore, the chips are removed over a wide range of the first surface.

In the first aspect of the present invention, the boundary portion may include: a first line portion; and a second line portion that is arranged at a predetermined angle with respect to the first line portion.

Thereby, the direction, in which the air jetted from the air jet port is supplied, is adjusted.

In the first aspect of the present invention, the air jet nozzle may repeat: an operation of jetting the air from the air jet port for a first period; and an operation of stopping the jetting for a second period after elapse of the first period.

Thereby, the chips on the first surface are smoothly removed, by the Coanda effect being obtained intermittently and shock fluid force of the chips working, based on the air jetted intermittently.

In the first aspect of the present invention, the dry machining apparatus may have a tubular member that has at least a part thereof being arranged around the air jet nozzle, and has an air outflow port that supplies, to the first surface, air that has flown in from an air inflow port formed between the tubular member and an outer surface of the air jet nozzle, and air that has been jetted from the air jet port.

Thereby, due to the air jetted from the air jet port, an ejector effect, by which the air around the tubular member flows into the air inflow port, is obtained. Both the air that has flown in from the air inflow port and the air that has been jetted from the air jet port are supplied from the air outflow port to the first surface. By the synergistic effect of: the ejector effect, by which the flow rate of the air supplied from the air outflow port is increased; and the Coanda effect, by which the air supplied from the air outflow port is drawn toward the first surface, the chips on the first surface are smoothly removed by the air from the air outflow port.

According to the second aspect of the present invention, a dry machining apparatus is provided which comprises: a tool that machines a workpiece; a first surface that is arranged below the tool and receives chips generated by the machining; an air jet nozzle that has an air jet port that jets air; and a tubular member that has at least a part thereof being arranged around the air jet nozzle, and has an air outflow port that supplies, to the first surface, air that has flown in from an air inflow port formed between the tubular member and an outer surface of the air jet nozzle, and air that has been jetted from the air jet port.

According to the second aspect of the present invention, the chips generated by the machining fall on the first surface. The tubular member is arranged around the air jet nozzle. The air inflow port is formed between the outer surface of the air jet nozzle and the inner surface of the tubular member. When air is jetted from the air jet port, by the ejector effect, air around the tubular member flows into inside of the tubular member via the air inflow port, and flows out from the air outflow port of the tubular member. Further, air jetted from the air jet port flows out from the air outflow port. Both the air that has flown in from the air inflow port and the air that has been jetted from the air jet port are supplied from the air outflow port to the first surface. Therefore, the chips on the first surface are smoothly removed by the air from the air outflow port. Further, since the flow rate of the air supplied from the air outflow port is increased by the ejector effect, even if the flow rate of the air jetted from the air jet port is reduced, air of flow rate sufficient for removal of the chips is supplied from the air outflow port to the first surface.

In the first and second aspect of the present invention, an air flow channel between the outer surface of the air jet nozzle and an inner surface of the tubular member may include a reducing portion having cross sectional area that decreases toward the air outflow port from the air inflow port.

Thereby, the ejector effect is effectively obtained in the state where the pressure of air in the reducing portion has been decreased and inflow of foreign matter into the air inflow port has been reduced.

In the first and second aspect of the present invention, the air flow channel of the tubular member includes an expanding portion having cross sectional area that increases toward the air outflow port.

Thereby, the ejector effect is effectively obtained, and the pressure of the air and the flow rate of the air flowing out from the air outflow port are increased.

In the first and second aspect of the present invention, the dry machining apparatus may have a first protrusion member that is provided at the air outflow port, and protrudes toward the center of the air outflow port.

Thereby, a longitudinal vortex is generated in the air supplied from the air outflow port. Since the longitudinal vortex is difficult to be damped, the air that has flown out from the air outflow port is able to reach a long distance while maintaining kinetic energy sufficient for removal of the chips. Therefore, the chips are removed over a wide range of the first surface.

In the first and second aspect of the present invention, the air jet nozzle has an inner flow channel including: a narrowed portion; a reducing diameter portion having cross sectional area that decreases toward the narrowed portion; and an expanding diameter portion having cross sectional area that increases toward the air jet port from the narrowed portion.

Thereby, the flow velocity of the air jetted from the air jet port is increased. Therefore, the chips on the first surface are smoothly removed by the air jetted from the air jet port.

According to the third aspect of the present invention, a dry machining apparatus is provided which comprises: a tool that machines a workpiece; a first surface that is arranged below the tool and receives chips generated by the machining; and an air jet nozzle that: has: an air jet port that jets air; and an inner flow channel including: a narrowed portion; a reducing diameter portion having cross sectional area that decreases toward the narrowed portion; and an expanding diameter portion having cross sectional area that increases toward the air jet port from the narrowed portion; and the air jet nozzle supplies, to the first surface, at least a part of the air that has flown through the inner flow channel and has been jetted from the air jet port.

According to the third aspect of the present invention, the chips generated by the machining fall on the first surface. The air jet nozzle is a Laval nozzle (diffuser nozzle) having the inner flow channel with the cross sectional area that increases toward the air jet port. Thereby, the flow velocity of the air jetted from the air jet port is increased. Therefore, the chips on the first surface are smoothly removed by the air jetted from the air jet port. Further, since the flow velocity of the air jetted from the air jet port is increased and the kinetic energy of the air is increased, even if the flow rate of the air jetted from the air jet port is reduced, air having kinetic energy sufficient for removal of the chips is supplied from the air jet port to the first surface.

In the second and third aspect of the present invention, the dry machining apparatus may include a second air jet nozzle that is arranged lower than the air jet nozzle, and that jets air having pressure lower than pressure of air jetted from the air jet port of the air jet nozzle.

Thereby, due to the pressure difference between the air jetted from the air jet nozzle and the air jetted from the second air jet nozzle, the air jetted from the air jet nozzle is drawn toward the first surface.

In the first, second and third aspect of the present invention, the dry machining apparatus may have a second protrusion member that is provided at the air jet port, and protrudes toward the center of the air jet port.

Thereby, a longitudinal vortex is generated in the air jetted from the air jet port. Since the longitudinal vortex is difficult to be damped, the air that has been jetted from the air jet port is able to reach a long distance while maintaining kinetic energy sufficient for removal of the chips. Therefore, the chips are removed over a wide range of the first surface.

Advantageous Effects of Invention

According to an aspect of the present invention, a dry machining apparatus that enables chips to be smoothly removed from a receiving surface is provided.

DESCRIPTION OF EMBODIMENTS

Hereinafter, embodiments according to the present invention will be described while reference is made to the drawings, but the present invention is not limited to these embodiments. Components of the respective embodiments described below may be combined with one another, as appropriate. Further, some of the components may be not used.

First Embodiment

Figure 1:
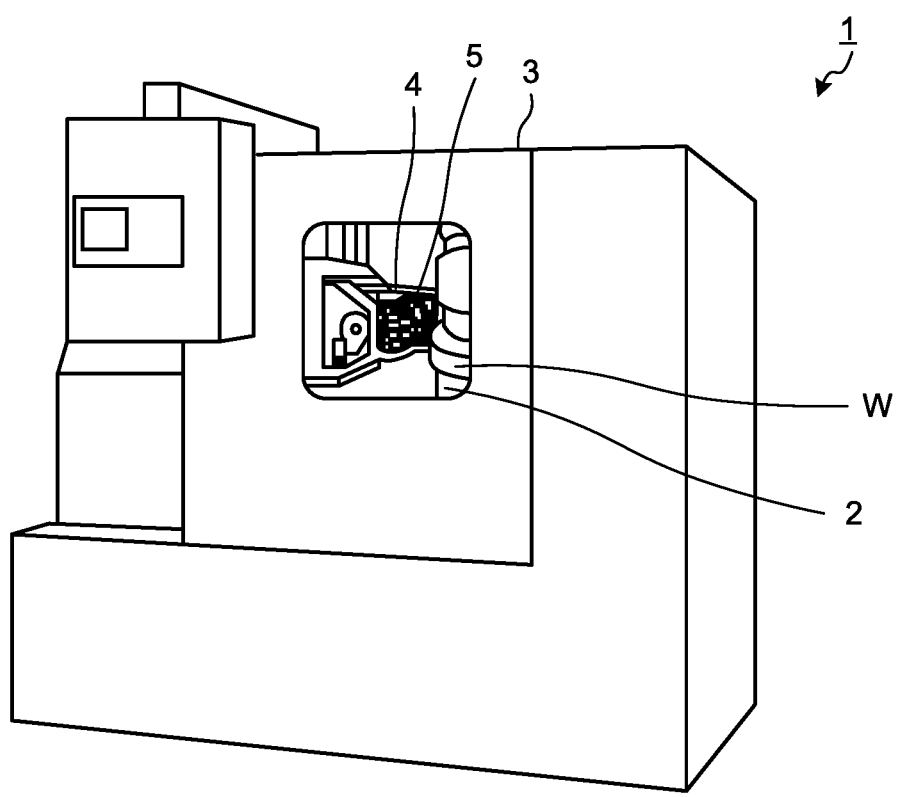
FIG. 1 is a perspective view illustrating an example of a dry machining apparatus according to a first embodiment.

A first embodiment will be described. FIG. 1 is a perspective view illustrating an example of a dry machining apparatus 1 according to this embodiment. The dry machining apparatus 1 machines a workpiece with a tool, without using a cutting oil. By machining without use of a cutting oil, degradation of the work environment is reduced. The dry machining apparatus 1 may be a dry cutting apparatus that cuts a workpiece with a cutting tool, or a dry polishing apparatus that polishes a workpiece with a polishing tool.

In this embodiment, the dry machining apparatus 1 includes a bobbing machine that manufactures gears. The dry machining apparatus 1 machines a workpiece W by using a hob 5, which is a tool. The dry machining apparatus 1 includes: the hob 5 that machines the workpiece W; a hob head 4 that rotatably supports the hob 5; a support device 2 that rotatably supports the workpiece W; and a chamber device 3. The hob 5, the hob head 4, and the support device 2 are arranged in an inner space of the chamber device 3. In the inner space of the chamber device 3, the hob 5 machines the workpiece W.

Figure 2:
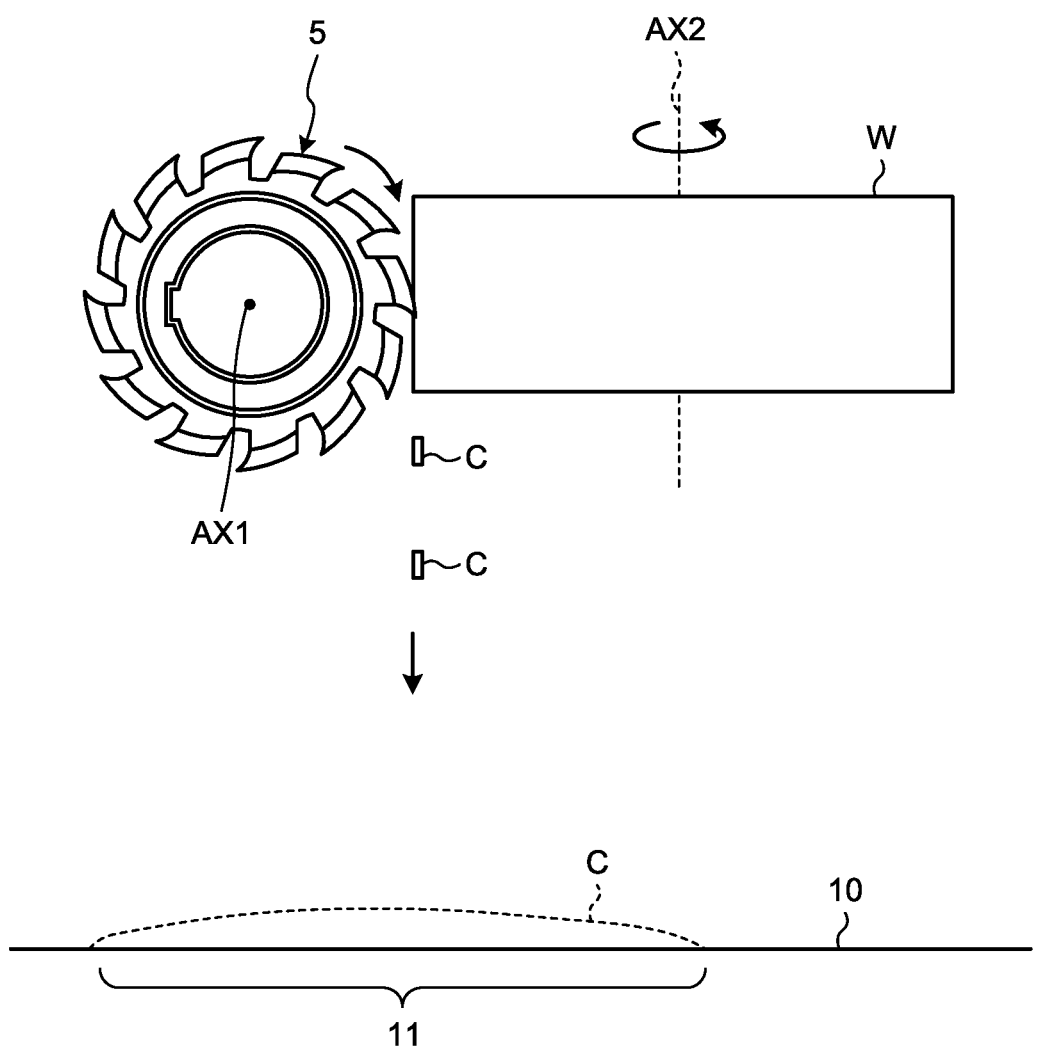
FIG. 2 is a diagram schematically illustrating an example of a hob and a workpiece, according to the first embodiment.

FIG. 2 is a diagram schematically illustrating an example of a state where the workpiece W is being machined by the hob 5 in the inner space of the chamber device 3 according to this embodiment. The hob 5 rotates around a central axis AX1 of the hob 5. The hob 5 rotates around the central axis AX1 by actuation of an actuator that the hob head 4 has. The workpiece W rotates around a central axis AX2 of the workpiece W. The workpiece W rotates around the central axis AX2 by actuation of an actuator that the support device 2 has. The workpiece W is machined by the hob 5 by rotating around the central axis AX2 in synchronization with the hob 5, in a state where a cutting edge of the hob 5 is in contact with the workpiece W.

When the workpiece W is machined by the hob 5, chips C are generated. The chips C generated by the machining fall on a receiving surface 10. The receiving surface 10 receives the chips C generated by the machining. The receiving surface 10 is arranged in the inner space of the chamber device 3. The receiving surface 10 is arranged below the hob 5. The receiving surface 10 includes, for example, a floor surface that is arranged in the inner space of the chamber device 3.

If the chips C fallen on the receiving surface 10 are left unattended, the chips C will be accumulated there, and may influence the operation of the dry machining apparatus 1. For example, if the receiving surface 10 includes a specific area 11 which is a guide surface that movably supports the hob head 4, and the state where the chips C have been accumulated in that specific area 11 is left unattended; smooth movement of the hob head 4 may become difficult. Further, if electric cables are arranged in the specific area 11 which is a partial area of the receiving surface 10, and the state where the chips C have been accumulated in that specific area 11 is left unattended; surfaces of the electric cables may be damaged.

Thus, in order to prevent the chips C from accumulating on at least the specific area 11 of the receiving surface 10 which influences the operation of the dry machining apparatus 1, a process of removing the chips C from that specific area 11 of the receiving surface 10 is performed. The chips C in the specific area 11 may be moved to an area of the receiving surface 10, the area being outside the specific area 11. The chips C moved outside the specific area 11 may be collected by a chip collecting device.

In this embodiment, the chips C in the specific area 11 are removed from the specific area 11 by use of force of air. The dry machining apparatus 1 includes a removal device 20 that removes the chips C from the specific area 11. The removal device 20 removes the chips C in the specific area 11 by using force of air. In the following description, the specific area 11 of the receiving surface, the specific area 11 being a target from which the chips C are to be removed, will be referred to as "first surface 11", as appropriate.

Figure 3:
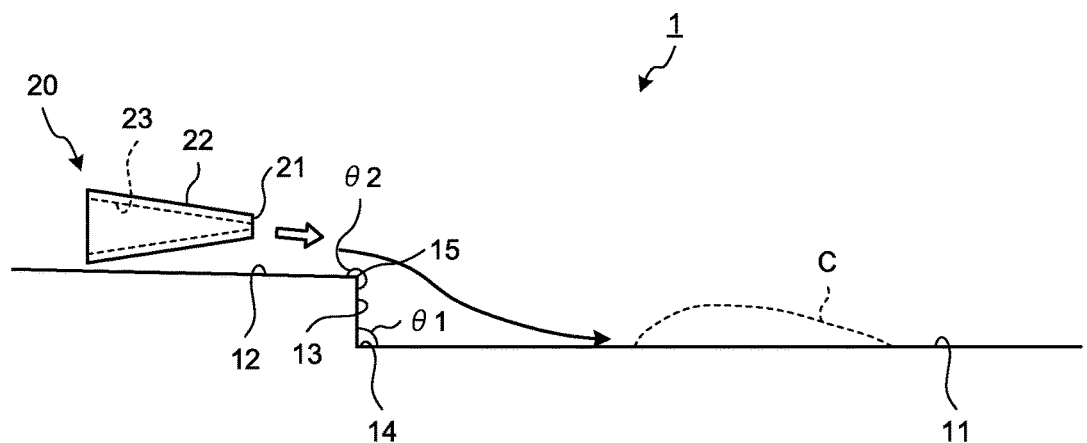
FIG. 3 is a side view schematically illustrating an example of a removal device according to the first embodiment.
Figure 4:
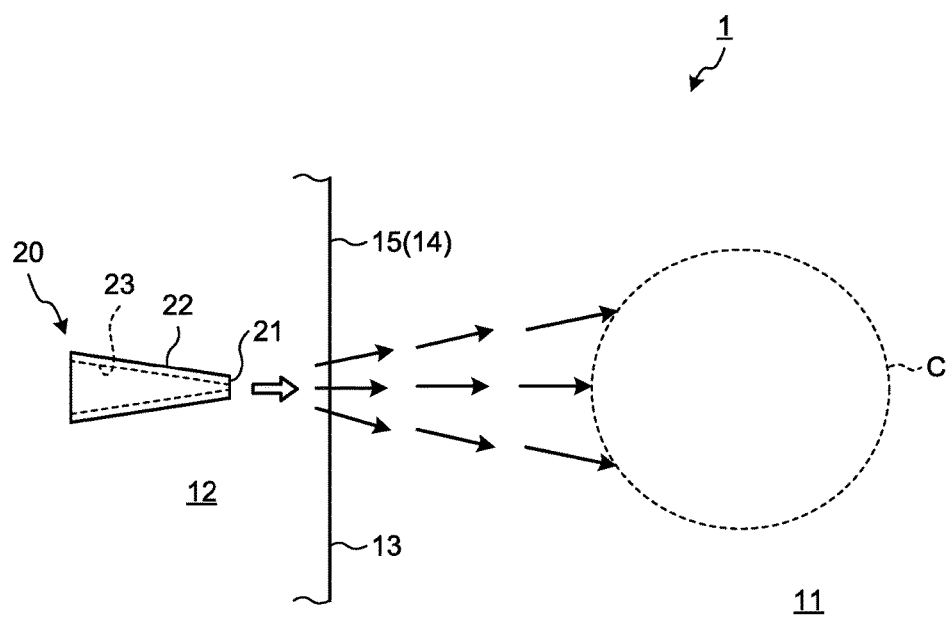
FIG. 4 is a plan view schematically illustrating the example of the removal device according to the first embodiment.

FIG. 3 is a side view schematically illustrating an example of the removal device 20 according to this embodiment. FIG. 4 is a plan view schematically illustrating the example of the removal device 20 according to this embodiment. The removal device 20 has an air jet nozzle 22 having an air jet port 21 that jets air.

In this embodiment, the dry machining apparatus 1 has: the first surface 11 that is arranged below the hob 5, and receives the chips C generated by the machining; a second surface 12 that is arranged upper than the first surface 11; and a third surface 13 that connects the first surface 11 and the second surface 12. A level difference is provided between the first surface 11 and the second surface 12. The first surface 11 is a plane. The second surface 12 is a plane. An angle θ1 formed between the first surface 11 and the third surface 13 is 90°. An angle θ2 formed between the second surface 12 and the third surface 13 is 270°. A boundary portion 14 including a corner portion is provided between the first surface 11 and the third surface 13. A boundary portion 15 including a corner portion is provided between the second surface 12 and the third surface 13. As illustrated in FIG. 4, in a plane parallel to a horizontal plane, the boundary portion 14 and the boundary portion 15 are linear.

The air jet nozzle 22 has an inner flow channel 23 that is connected to the air jet port 21. Cross sectional area of the inner flow channel 23 decreases toward the air jet port 21. Air that has flown through the inner flow channel 23 is jetted from the air jet port 21 at high flow velocity by a nozzle effect.

The air jet nozzle 22 is arranged above the second surface 12. The air jet port 21 jets air toward the boundary portion 15 between the second surface 12 and the third surface 13, from the second surface 12. At least a part of the air jetted from the air jet port 21 is supplied to the first surface 11. By the supply of at least the part of the air jetted out from the air jet port 21 to the first surface 11, the chips C on the first surface 11 are removed from the first surface 11. By force of the air, the chips C on the first surface 11 are blown off from the first surface 11.

The first surface 11 is arranged below the hob 5. The chips C generated by the machining fall on the first surface 11. The first surface 11 receives the chips C generated by the machining. At least a part of the air jetted from the air jet port 21 is supplied to the second surface 12. When the air is jetted from the air jet port 21 to at least the part of the second surface 12, the air flows toward the first surface 11 from the second surface 12.

The air is separated at the second surface 12, or at the boundary portion 15 between the second surface 12 and the third surface 13. The air that has been separated at at least one of the second surface 12 and the boundary portion 15 flows so as to be drawn toward the first surface 11, by the Coanda effect.

The air that has been drawn toward the first surface 11 due to the Coanda effect becomes difficult to be separated from the first surface 11. Therefore, diffusion or damping of the air on the first surface 11 is reduced. By the air flowing on the first surface 11 in the state where diffusion or damping has been reduced, the chips C on the first surface 11 are smoothly removed by that air.

In the dry machining apparatus 1, although a cutting oil is not used, a lubricating oil for lubricating driving units of the hob head 4 and the support device 2 is used. Thus, the inner space of the chamber device 3 is brought into a state where the lubricating oil has been sprayed. Oil droplets or oil films due to the lubricating oil may be present on surfaces of parts in the inner space of the chamber device 3.

When oil droplets or an oil film due to the lubricating oil are present on the first surface 11, adhesion force between the chips C and the first surface 11 is increased, and it may become difficult for the chips to be removed smoothly from the first surface 11.

In this embodiment, a level difference is provided between the first surface 11 and the second surface 12, and the air jetted from the air jet port 21 flows toward the first surface 11 from the second surface 12. Due to effects of the level difference, the Coanda effect is obtained, and the air flows on the first surface 11 in the state of being drawn toward the first surface 11. Accordingly, even if oil droplets or an oil film due to the lubricating oil are present on the first surface 11, air having force (kinetic energy) stronger than the adhesion force between the chips C and the first surface 11 is supplied between the chips C and the first surface 11. Therefore, the chips C present on the first surface 11 are smoothly removed from the first surface 11 by the force of the air.

As described above, according to this embodiment, since the second surface 12 is provided at a position higher than that of the first surface 11 where the chips C are present, and air is supplied toward the first surface 11 from the second surface 12, the Coanda effect is obtained. The chips C present on the first surface 11 are smoothly removed from the first surface 11 by the air, which has been obtained by the Coanda effect and flows on the first surface 11.

Further, since the chips C are efficiently removed by the Coanda effect, even if the flow rate of the air jetted from the air jet port 21 is reduced, the chips C are smoothly removed.

Figure 5:
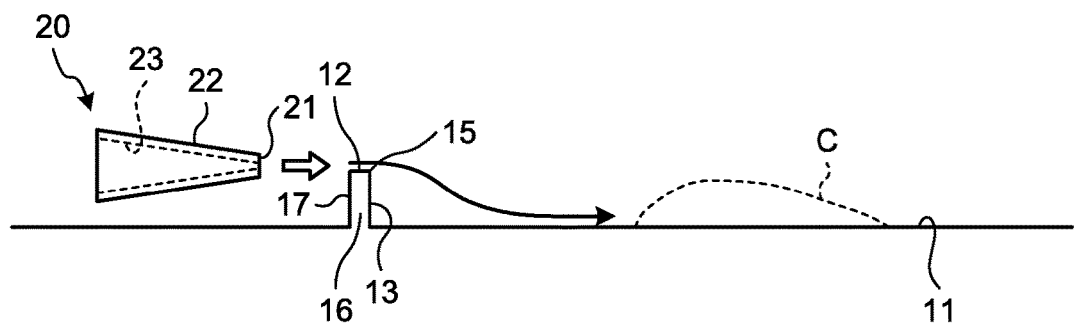
FIG. 5 is a side view schematically illustrating an example of the removal device according to the first embodiment.

FIG. 5 is a side view schematically illustrating an example of the removal device 20 according to this embodiment. In FIG. 5, the dry machining apparatus 1 has a protrusion member 16 that is provided on the first surface 11. The protrusion member 16 has: the second surface 12 that is arranged upper than the first surface 11; the third surface 13 that connects between the first surface 11 and one of end portions of the second surface 12; and a fourth surface 17 that connects between the first surface 11 and the other end portion of the second surface 12.

The air jet nozzle 22 of the removal device 20 is arranged in a space faced by the fourth surface 17. The air jet port 21 of the air jet nozzle 22 jets air toward the boundary portion between the second surface 12 and the third surface 13, from the second surface 12. At least a part of the air jetted from the air jet port 21 is supplied to the first surface 11. By the air supplied to the first surface 11, the chips C on the first surface 11 are removed from the first surface 11.

In the example illustrated in FIG. 5 also, due to the Coanda effect, the air jetted from the air jet port 21 is drawn toward the first surface 11. The chips C on the first surface 11 are smoothly removed by the air flowing on the first surface 11.

Figure 6:
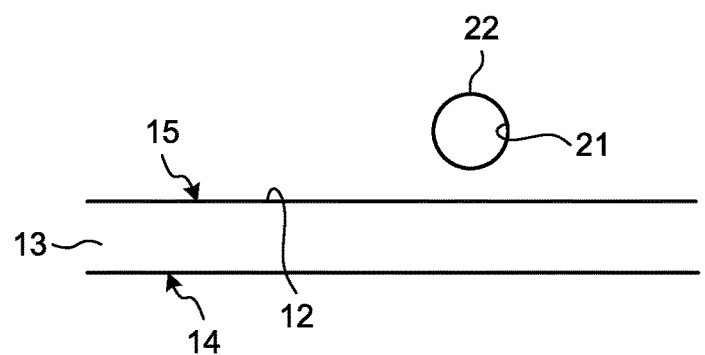
FIG. 6 is a diagram schematically illustrating an example of an air jet port according to the first embodiment.
Figure 7:
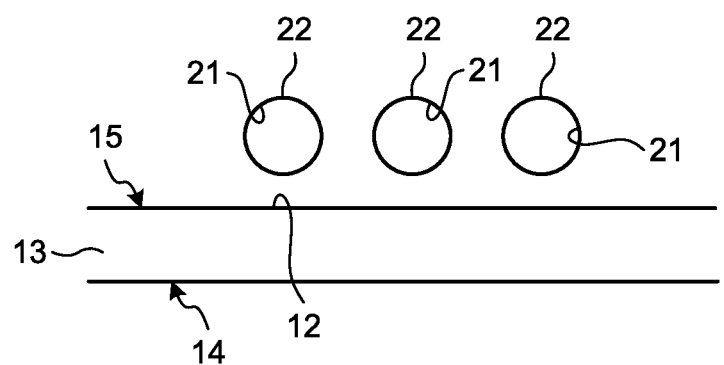
FIG. 7 is a diagram schematically illustrating an example of air jet ports according to the first embodiment.
Figure 8:
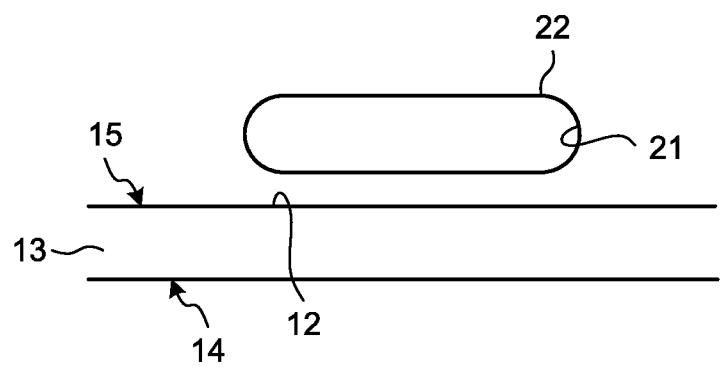
FIG. 8 is a diagram schematically illustrating an example of the air jet port according to the first embodiment.

FIG. 6, FIG. 7, and FIG. 8 are front views schematically illustrating examples of the air jet port 21 according to this embodiment. As illustrated in FIG. 6, the air jet port 21 may be circular.

As illustrated in FIG. 7, plural air jet nozzles 22 may be arranged along the boundary portion 15. As the plural air jet ports 21 are arranged, the Coanda effect is obtained over a wide range of the first surface 11, and the chips C are removed over a wide range of the first surface 11.

As illustrated in FIG. 8, a dimension of the air jet port 21 relative to a horizontal direction parallel to the first surface 11 and the second surface 12 may be larger than a dimension of the air jet port 21 relative to a vertical direction. Since the air jet port 21 is elongated along the boundary portion 15, the Coanda effect is obtained over a wide range of the first surface 11, and the chips C are removed over a wide range of the first surface 11.

Figure 9:
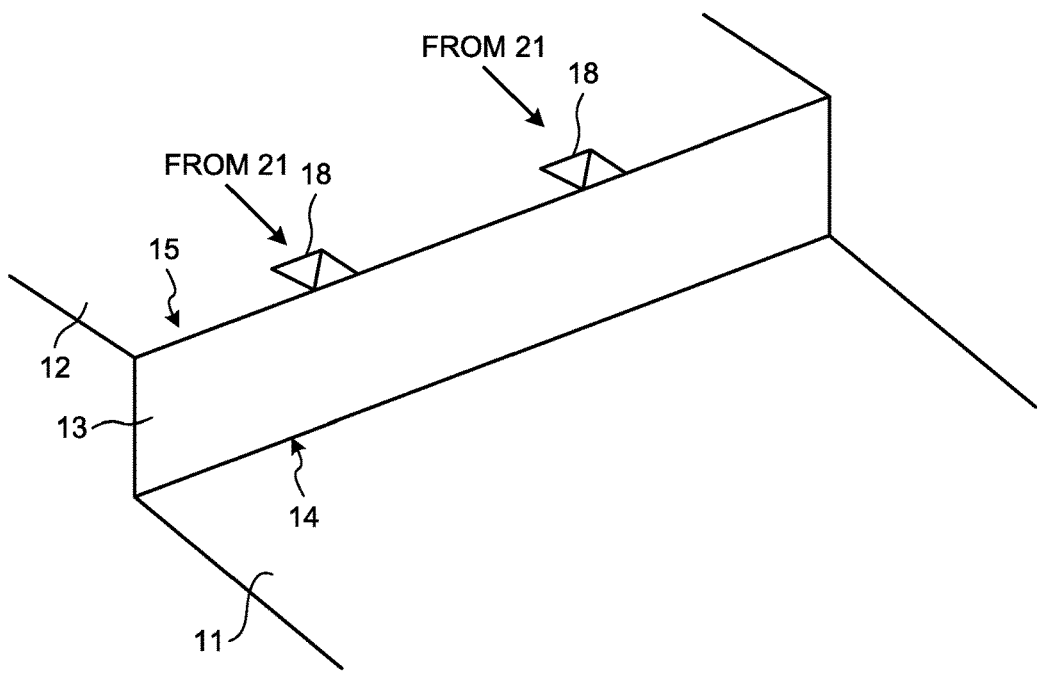
FIG. 9 is a diagram schematically illustrating an example of a boundary portion according to the first embodiment.
Figure 10:
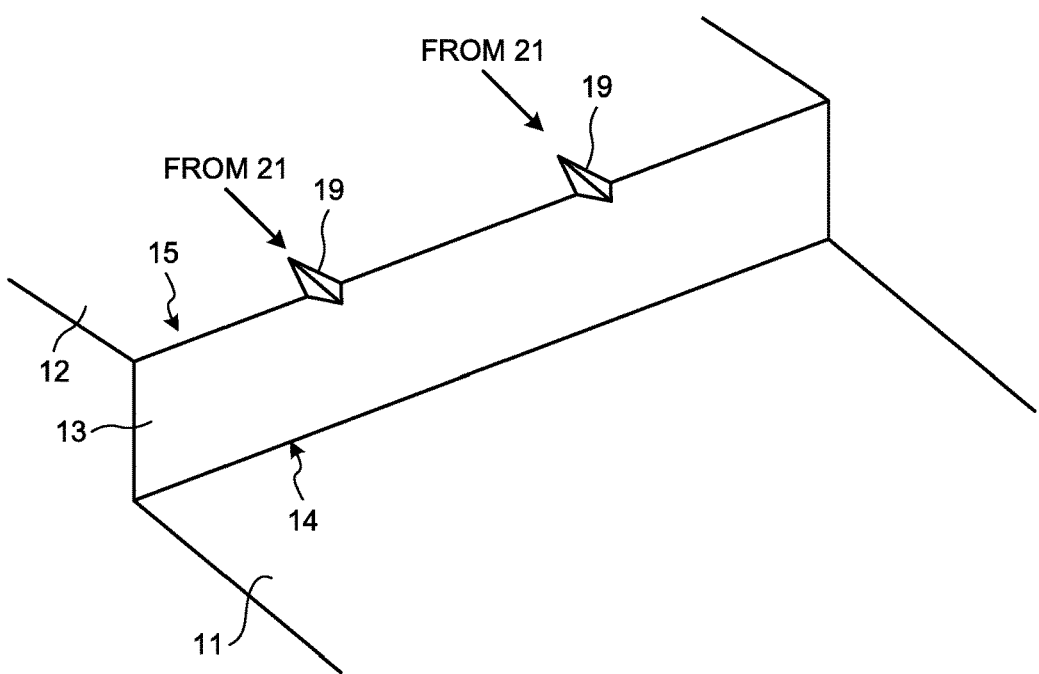
FIG. 10 is a diagram illustrating an example of the boundary portion according to the first embodiment.
Figure 11:
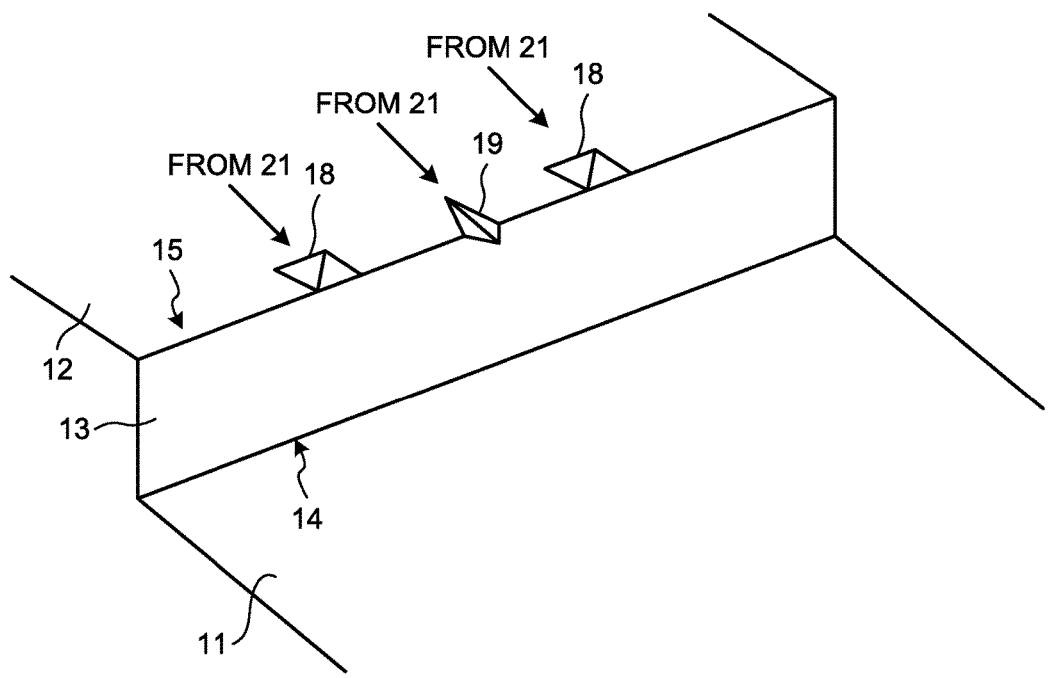
FIG. 11 is a diagram illustrating an example of the boundary portion according to the first embodiment.

FIG. 9, FIG. 10, and FIG. 11 are diagrams illustrating examples of the boundary portion 15 according to this embodiment. As illustrated in FIG. 9, a convex portion 18 protruding from the second surface 12 may be provided at the boundary portion 15. As illustrated in FIG. 10, a concave portion 19 recessed from the second surface 12 may be provided at the boundary portion 15. As illustrated in FIG. 11, both the convex portion and the concave portion 19 may be provided at the boundary portion 15.

By the air jetted from the air jet port 21 being supplied to one or both of the convex portion 18 and the concave portion 19, a longitudinal vortex is generated in the air that has passed the boundary portion 15. Since the longitudinal vortex is difficult to be damped, the air that has been jetted from the air jet port 21 and has passed the boundary portion 15 is able to reach a long distance while maintaining kinetic energy sufficient for removal of the chips C. Therefore, the chips are removed over a wide range of the first surface 11.

Figure 12:
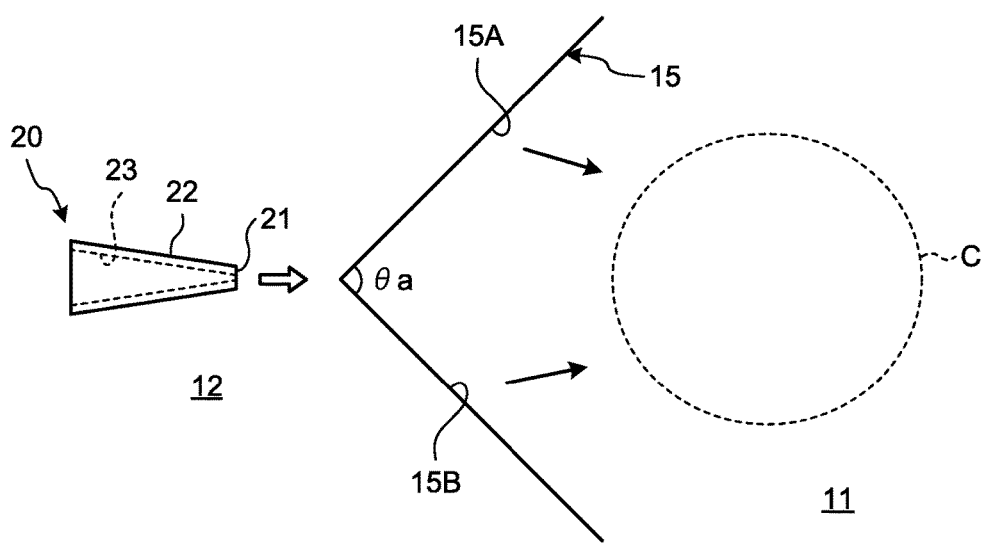
FIG. 12 is a diagram illustrating an example of the boundary portion according to the first embodiment.
Figure 13:
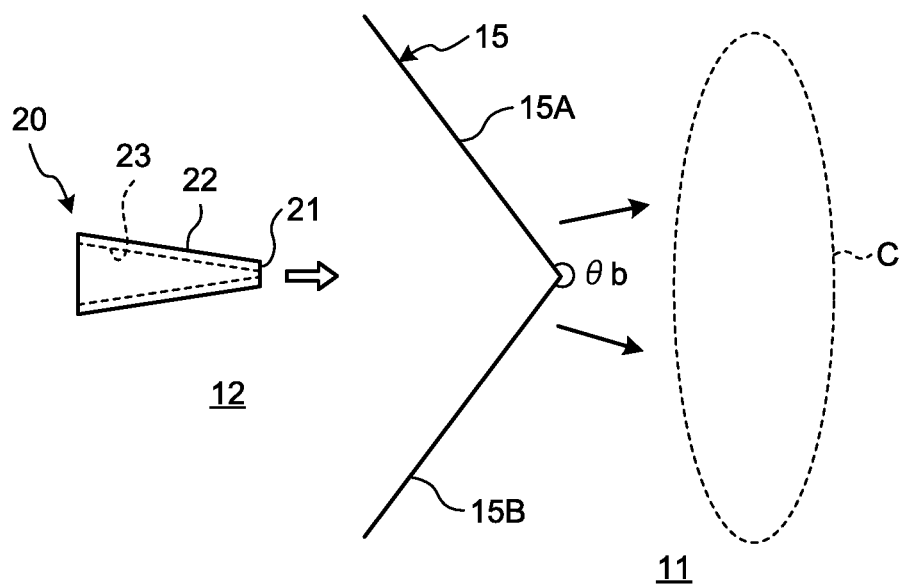
FIG. 13 is a diagram illustrating an example of the boundary portion according to the first embodiment.

FIG. 12, FIG. 13, FIG. 14, and FIG. 15 are diagrams illustrating examples of the boundary portion 15 according to this embodiment. As illustrated in FIG. 12, the boundary portion 15 may include: a first line portion 15A; and a second line portion 15B that is arranged at a predetermined angle θa smaller than 180° with respect to the first line portion 15A. As illustrated in FIG. 13, the boundary portion 15 may include: the first line portion 15A; and a second line portion 15B that is arranged at a predetermined angle θb larger than 180° with respect to the first line portion 15A. In the examples illustrated in FIG. 12 and FIG. 13, the first line portion 15A and the second line portion 15B are linear.

Figure 14:
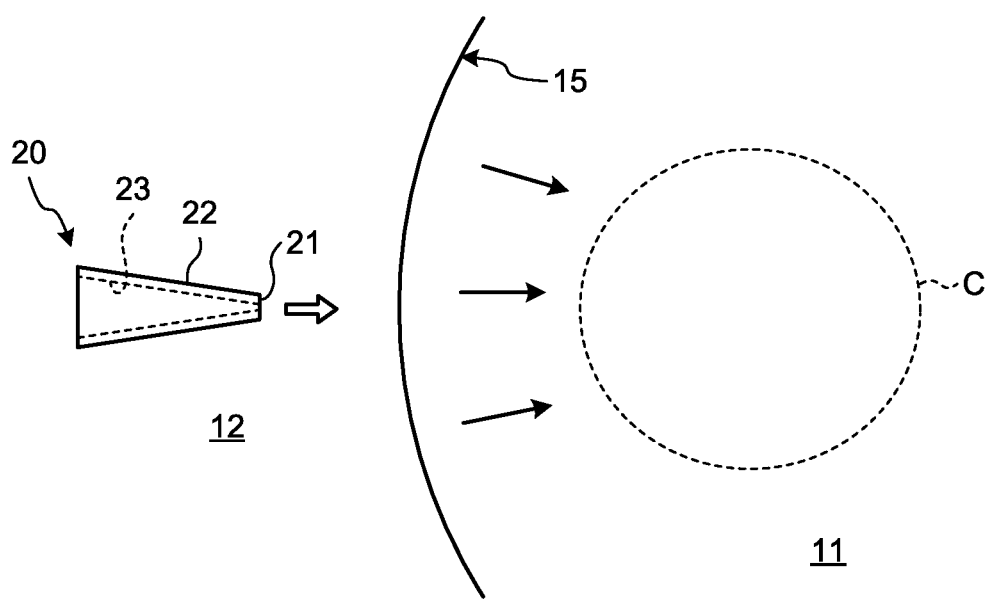
FIG. 14 is a diagram illustrating an example of the boundary portion according to the first embodiment.
Figure 15:
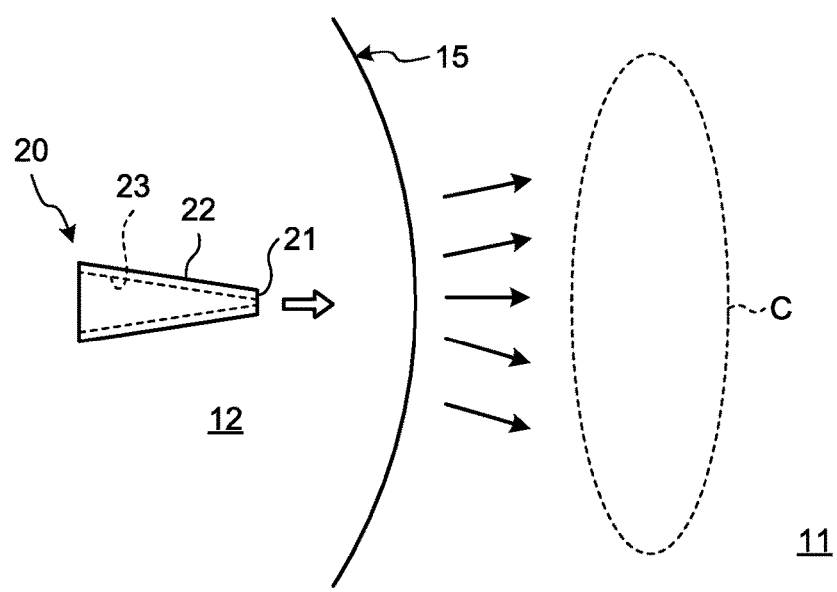
FIG. 15 is a diagram illustrating an example of the boundary portion according to the first embodiment.

As illustrated in FIG. 14 and FIG. 15, the boundary portion 15 may have a curve shape. As illustrated in FIG. 14, the boundary portion 15 may have a curve shape recessed toward the second surface 12. As illustrated in FIG. 15, the boundary portion 15 may have a curve shape protruding toward the first surface 11.

In the example illustrated in FIG. 12, air that has passed the first line portion 15A and air that has passed the second line portion 15B collect together at the first surface 11. Thereby, the chips C on the first surface 11 are smoothly removed by air having strong force.

In the example illustrated in FIG. 13, air that has passed the first line portion 15A and air that has passed the second line portion 15B diffuse over the first surface 11. Thereby, the chips C are smoothly removed by force of the air, over a wide range of the first surface 11.

As illustrated in FIG. 14, by the boundary portion 15 having the curve shape recessed toward the second surface 12, air that has passed the boundary portion 15 collects at the first surface 11. Thereby, the chips C on the first surface 11 are smoothly removed by air having strong force.

As illustrated in FIG. 15, by the boundary portion 15 having the curve shape protruding toward the first surface 11, air that has passed the boundary portion 15 diffuses over the first surface 11. Thereby, the chips C are smoothly removed by force of the air, over a wide range of the first surface 11.

As described above, by the adjustment of the shape of the boundary portion 15, the direction, in which the air that has been jetted from the air jet port 21 and has passed the boundary portion 15 is supplied at the first surface 11, is adjusted.

In this embodiment, the air jet nozzle 22 may continuously jet air from the air jet port 21. The air jet nozzle 22 may repeat: an operation of jetting air from the air jet port 21 for a first period; and an operation of stopping the jetting for a second period after elapse of the first period. That is, the air jet nozzle 22 may jet air from the air jet port 21 intermittently (on and off). If air is jetted intermittently, based on the air jetted intermittently, the Coanda effect is obtained intermittently, and thus the chips C on the first surface 11 are removed smoothly. The same applies to the following embodiments.

Second Embodiment

A second embodiment will now be described. In the following description, to components that are the same or equivalent to those of the above described embodiment, the same signs will be appended, and description thereof will be simplified or omitted.

Figure 16:
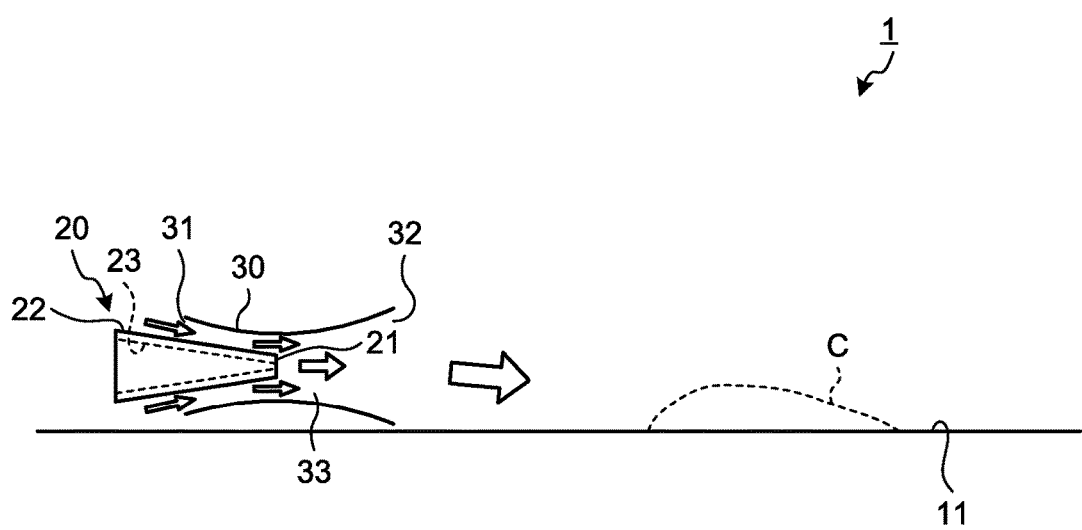
FIG. 16 is a diagram schematically illustrating an example of a dry machining apparatus according to a second embodiment.

FIG. 16 is a diagram schematically illustrating an example of the dry machining apparatus 1 according to this embodiment. Similarly to the above described embodiment, the first surface 11 is arranged below the hob 5. The first surface 11 receives the chips C generated by the machining.

As illustrated in FIG. 16, the removal device 20 includes: the air jet nozzle 22 having the air jet port 21 that jets air; and a tubular member 30 having at least a part thereof arranged around the air jet nozzle 22 and having an air outflow port 32 that supplies, to the first surface 11, air that has flown in from an air inflow port 31 formed between the tubular member 30 and an outer surface of the air jet nozzle 22, and the air that has been jetted from the air jet port 21.

The air jet nozzle 22 has a configuration that is the same as that of the air jet nozzle 22 described in the above described embodiment. Description of the air jet nozzle 22 will be omitted.

The tubular member 30 has an inner surface that faces the outer surface of the air jet nozzle 22 via a gap. By the inner surface of the tubular member 30, an air flow channel 33, through which air flows, is formed. The air outflow port 32 is arranged toward the first surface 11 than the air jet port 21 is.

Figure 17:
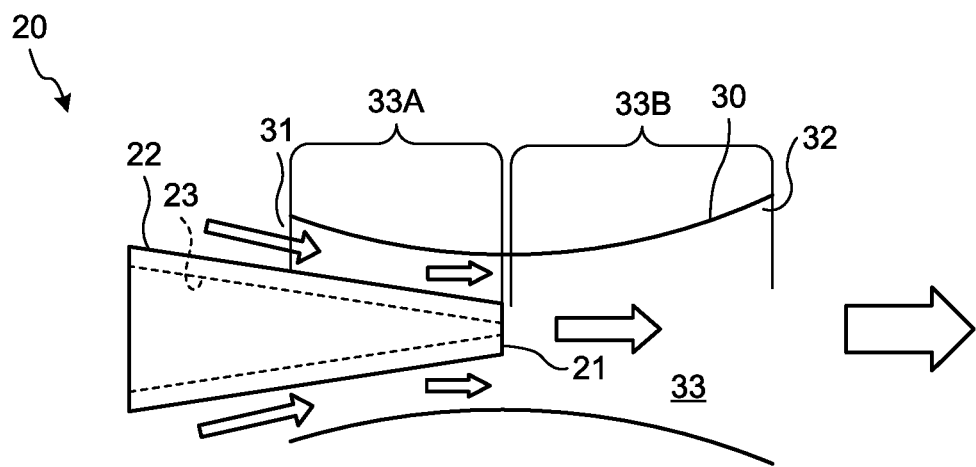
FIG. 17 is a diagram schematically illustrating an example of a removal device according to the second embodiment.

FIG. 17 is an enlarged diagram of the removal device 20 according to this embodiment. The air flow channel 33 includes: a first air flow channel 33A between the outer surface of the air jet nozzle 22 and the inner surface of the tubular member 30; and a second air flow channel 33B that is not faced to the outer surface of the air jet nozzle 22. The first air flow channel 33A is connected to the air inflow port 31. The second air flow channel 33B is connected to the air outflow port 32.

The first air flow channel 33A includes a reducing portion having cross sectional area that decreases toward the air outflow port 32 from the air inflow port 31. The second air flow channel 33B includes an expanding portion having cross sectional area that increases toward the air outflow port 32.

According to this embodiment, when air is jetted from the air jet port 21, due to the ejector effect, air around the tubular member 30 flows into the air flow channel 33 inside the tubular member 30 via the air inflow port 31. That is, when air having high flow velocity is jetted from the air jet port 21, the ejector effect, by which air therearound flows into the air flow channel 33 from the air inflow port 31, is generated. The air that has flown into the air flow channel 33 from the air inflow port 31 by the ejector effect flows out from the air outflow port 32 of the tubular member 30.

Further, the air jetted from the air jet port 21 also flows out from the air outflow port 32. Both the air that has flown into the air flow channel 33 from the air inflow port 31 and the air jetted from the air jet port 21 are supplied to the first surface 11 from the air outflow port 32. The flow rate of air supplied to the first surface 11 from the air outflow port 32 is the sum of the air that has flown into the air flow channel 33 from the air inflow port 31 and the air that has been jetted from the air jet port 21. Therefore, air having large flow rate is supplied from the air outflow port 32 to the first surface 11. Accordingly, the chips C on the first surface 11 are smoothly removed by the air from the air outflow port 32.

Further, since the flow rate of the air supplied from the air outflow port 32 is increased, even if the flow rate of the air jetted from the air jet port 21 is reduced, air having flow rate sufficient for removal of the chips C is supplied to the first surface 11 from the air outflow port 32.

Further, in this embodiment, the first air flow channel 33A between the outer surface of the air jet nozzle 22 and the inner surface of the tubular member 30 includes the reducing portion. The reducing portion has the cross sectional area that decreases toward the air outflow port 32 from the air inflow port 31. Thereby, the ejector effect is effectively obtained in the state where the pressure of air in the reducing portion has been decreased and inflow of foreign matter into the air inflow port 31 has been reduced.

Further, in this embodiment, the second air flow channel 33B of the tubular member 30 includes the expanding portion. The expanding portion has the cross sectional area that increases toward the air outflow port 32. Thereby, the ejector effect is effectively obtained, and the pressure of the air and the flow rate of the air flowing out from the air outflow port 32 are increased.

Figure 18:
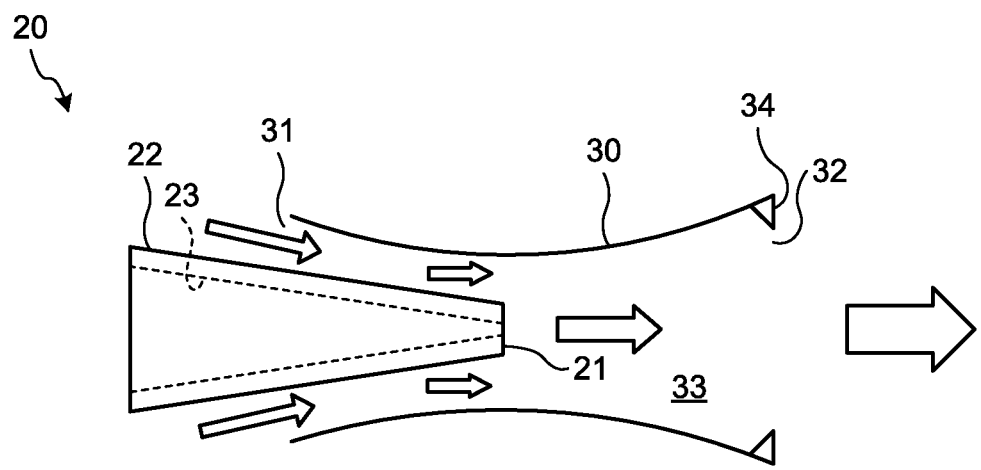
FIG. 18 is a diagram schematically illustrating an example of a tubular member according to the second embodiment.
Figure 19:
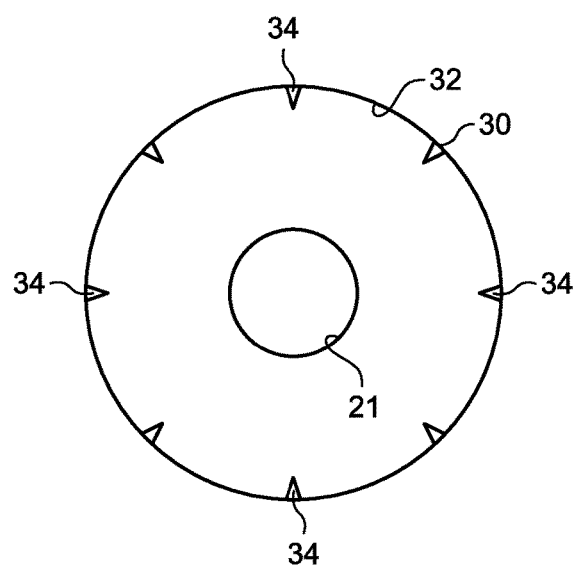
FIG. 19 is a front view illustrating the tubular member according to the second embodiment.

FIG. 18 is a diagram schematically illustrating an example of the tubular member 30 according to this embodiment. FIG. 19 is a front view illustrating a part of the tubular member 30 according to this embodiment. As illustrated in FIG. 18 and FIG. 19, the tubular member 30 may have a first protrusion member 34. The first protrusion member 34 is provided at the air outflow port 32. The first protrusion member 34 is provided in a predetermined area of the inner surface of the tubular member 30, the predetermined area being near the air outflow port 32. The first protrusion member 34 is provided to protrude from the inner surface of the tubular member 30, toward the center of the air outflow port 32. Plural first protrusion members 34 are provided to surround the center of the air outflow port 32.

By the provision of the first protrusion members 34, a longitudinal vortex is formed in the air supplied from the air outflow port 32. Since the longitudinal vortex is difficult to be damped, the air that has flown out from the air outflow port 32 is able to reach a long distance while maintaining kinetic energy sufficient for removal of the chips C. Accordingly, the chips C are removed over a wide range of the first surface 11.

Third Embodiment

A third embodiment will now be described. In the following description, to components that are the same or equivalent to those of the above described embodiments, the same signs will be appended, and description thereof will be simplified or omitted.

Figure 20:
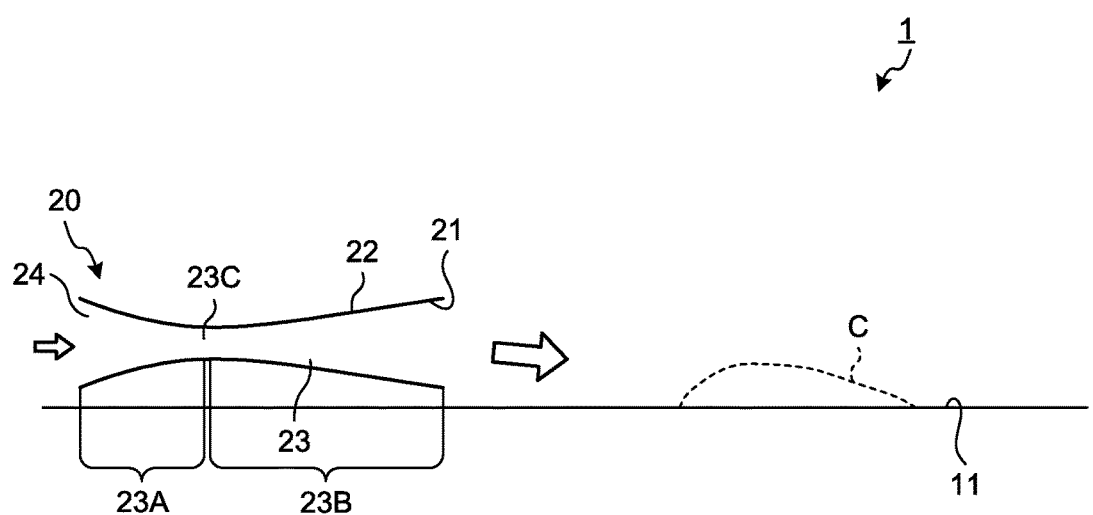
FIG. 20 is a diagram schematically illustrating an example of a dry machining apparatus according to a third embodiment.

FIG. 20 is a diagram schematically illustrating an example of the dry machining apparatus 1 according to this embodiment. Similarly to the above described embodiments, the first surface 11 is arranged below the hob 5. The first surface 11 receives the chips C generated by the machining.

The removal device 20 removes, from the first surface 11, the chips C present on the first surface 11, by using force of air. The removal device 20 has: the air jet port 21 that jets air; the inner flow channel 23, through which the air jetted from the air jet port 21 flows; and an air introduction port 24 for introducing air into the inner flow channel 23.

The inner flow channel 23 includes: a narrowed portion 23C; a reducing diameter portion 23A having cross sectional area that decreases toward the narrowed portion 23C from the air introduction port 24; and an expanding diameter portion 23B having cross sectional area that increases toward the air jet port 21 from the narrowed portion 23C. The air jet nozzle 22 supplies at least a part of the air that has flown through the inner flow channel 23 and has been jetted from the air jet port 21, to the first surface 11.

In this embodiment, the air jet nozzle 22 is a Laval nozzle (diffuser nozzle) having the inner flow channel 23 with cross sectional area that increases toward the air jet port 21. Thereby, the flow velocity of the air jetted from the air jet port 21 is increased.

Air is supplied from an air supply source (not illustrated) to the air introduction port 24. The air supply source sets pressure of the air supplied, such that a choke (choked flow) is generated at the narrowed portion 23C.

Generally, when a choke is generated, even if the pressure (back pressure) of the air from the air supply source is increased, the flow velocity of the air is not increased. In this embodiment, since the expanding diameter portion 23B is provided, even if the pressure of the air from the air supply source is set to the pressure, at which a choke is generated, the flow velocity of the air supplied to the narrowed portion 23C via the reducing diameter portion 23A is increased in the expanding diameter portion 23B. In this embodiment, the air jetted from the air jet port 21 is accelerated to supersonic velocity.

Force of air for removal of the chips C is said to be "(density of air)×(flow velocity of air)×(flow velocity of air)×(constant)". By increase in the flow velocity of the air jetted from the air jet port 21, strong force of air for removal of the chips C is obtained. Therefore, in this embodiment, the chips C on the first surface 11 are smoothly removed by the air jetted from the air jet port 21.

Further, since the flow velocity of the air jetted from the air jet port 21 is increased and the kinetic energy of the air is increased, even if the flow rate of the air jetted from the air jet port 21 is reduced, air having kinetic energy sufficient for removal of the chips C is supplied from the air jet port 21 to the first surface 11.

Figure 21:
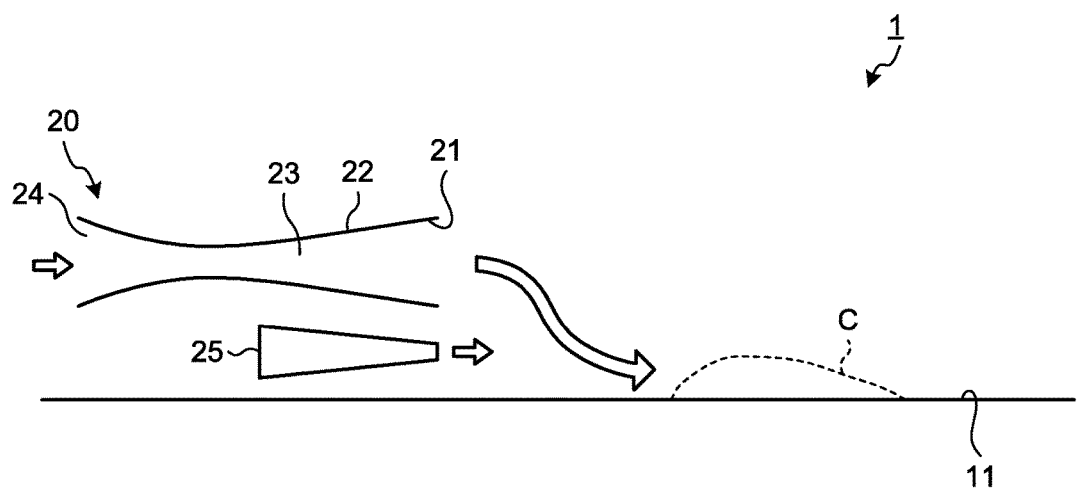
FIG. 21 is a diagram schematically illustrating an example of a removal device according to the third embodiment.

FIG. 21 is a diagram schematically illustrating an example of the removal device 20 according to this embodiment. As illustrated in FIG. 21, the removal device 20 includes: the air jet nozzle (Laval nozzle) 22 that has been described by reference to FIG. 20; and a second air jet nozzle 25 that is arranged lower than the air jet nozzle 22, and jets air having pressure lower than the pressure of the air jetted from the air jet port 21 of the air jet nozzle 22. The second air jet nozzle 25 is arranged between the air jet nozzle 22 and the first surface 11.

The pressure of the air jetted from the air jet nozzle 22 and the pressure of the air jetted from the second air jet nozzle 25 are different from each other. Due to the pressure difference between the air jetted from the air jet nozzle 22 and the air jetted from the second air jet nozzle 25, the air jetted from the air jet nozzle 22 is drawn toward the first surface 11. Thereby, by use of the air having high flow velocity jetted from the air jet nozzle 22, the chips C on the first surface 11 are removed. Further, in this embodiment, both the air from the air jet nozzle 22 and the air from the second air jet nozzle 25 are supplied to the first surface 11. That is, air having large flow rate will be supplied to the first surface 11, and thus the chips C on the first surface 11 will be smoothly removed.

Fourth Embodiment

A fourth embodiment will now be described. In the following description, to components that are the same or equivalent to those of the above described embodiments, the same signs will be appended, and description thereof will be simplified or omitted.

Figure 22:
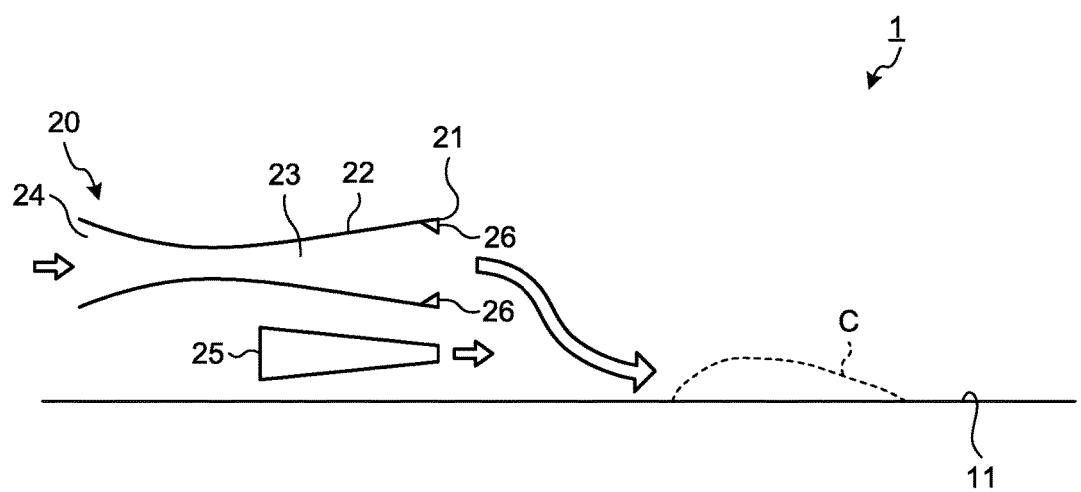
FIG. 22 is a diagram schematically illustrating an example of an air jet nozzle according to a fourth embodiment.
Figure 23:
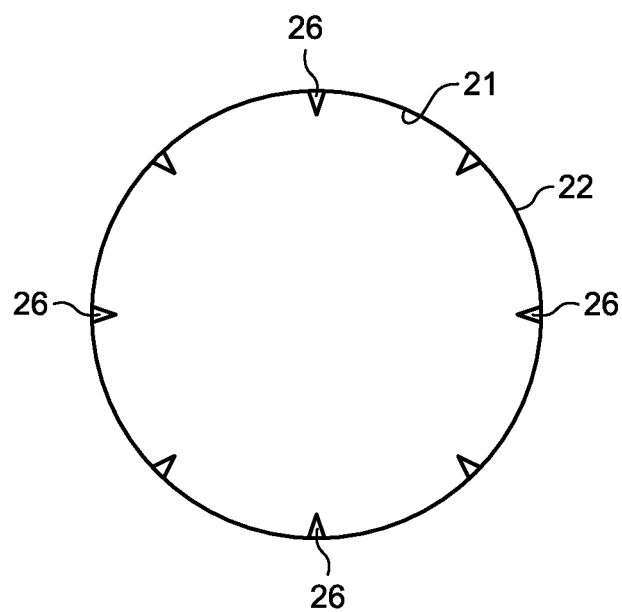
FIG. 23 is a front view illustrating the air jet nozzle according to the fourth embodiment.

FIG. 22 is an enlarged cross sectional view of a part of the air jet nozzle 22 according to this embodiment. FIG. 23 is a front view illustrating a part of the air jet nozzle 22 according to this embodiment. As illustrated in FIG. 22 and FIG. 23, the air jet nozzle 22 may have a second protrusion member 26. In the example illustrated in FIG. 22, although the second air jet nozzle 25 that has been described by reference to FIG. 21 is provided, the second air jet nozzle 25 may be not included.

The second protrusion member 26 is provided at the air jet port 21. The second protrusion member 26 is provided in a predetermined area of an inner surface of the air jet nozzle 22, the predetermined area being near the air jet port 21. The second protrusion member 26 is provided to protrude from the inner surface of the air jet nozzle 22, toward the center of the air jet port 21. Plural second protrusion members 26 are provided to surround the center of the air jet port 21.

By the provision of the second protrusion members 26, a longitudinal vortex is formed in the air supplied from the air jet port 21. Since the longitudinal vortex is difficult to be damped, the air that has flown out from the air jet port 21 is able to reach a long distance while maintaining kinetic energy sufficient for removal of the chips C. Accordingly, the chips C are removed over a wide range of the first surface 11.

The second protrusion members 26 that have been described by reference to FIG. 22 and FIG. 23: may be arranged at the air jet port 21 of the air jet nozzle 22 that has been described with respect to the first embodiment; may be arranged at the air jet port 21 of the air jet nozzle 22 that has been described with respect to the second embodiment; or may be arranged at the air jet port 21 of the air jet nozzle (Laval nozzle) 22 that has been described with respect to the third embodiment.

The above described first embodiment, second embodiment, third embodiment, and fourth embodiment may be combined with one another, as appropriate.

For example, the air jet nozzle 22 that has been described with respect to at least one of the second embodiment, third embodiment, and fourth embodiment may be arranged above the second surface 12. For example, at least a part of the tubular member 30 may be arranged around the air jet nozzle 22 arranged above the second surface 12 that has been described with respect to the first embodiment. Thereby, in the dry machining apparatus 1 that has been described with respect to the first embodiment, air flows into the air flow channel 33, due to the ejector effect, from the air inflow port 31 formed between the outer surface of the air jet nozzle 22 and the inner surface of the tubular member 30, and air that has flown in from the air inflow port 31 and air that has been jetted from the air jet port 21 are supplied from the air outflow port 32. The air from the air outflow port 32 is supplied so as to be drawn toward the first surface 11, via the second surface 12 and the boundary portion 15, due to the Coanda effect.

Further, the first embodiment and the third embodiment may be combined with each other. For example, the air jet nozzle (Laval nozzle) 22, which has the inner flow channel 23 including: the narrowed portion 23C; the reducing diameter portion 23A having the cross sectional area that decreases toward the narrowed portion 23C; and the expanding diameter portion 23B having the cross sectional area that increases toward the air jet port 21 from the narrowed portion 23C, and which is able to jet air having supersonic velocity from the air jet port 21, may be arranged above the second surface 12. The air having the supersonic velocity jetted from the air jet nozzle 22 is supplied so as to be drawn toward the first surface 11, via the second surface 12 and the boundary portion 15, due to the Coanda effect.

Further, the second embodiment and the third embodiment may be combined with each other. For example, the tubular member 30 may be arranged around the air jet nozzle (Laval nozzle) 22, which has the inner flow channel 23 including: the narrowed portion 23C; the reducing diameter portion 23A having the cross sectional area that decreases toward the narrowed portion 23C; and the expanding diameter portion 23B having the cross sectional area that increases toward the air jet port 21 from the narrowed portion 23C, and which is able to jet air having supersonic velocity from the air jet port 21. By the air having supersonic velocity being jetted from the air jet port 21 of the air jet nozzle 22, due to the ejector effect, air around the tubular member 30 flows into the air flow channel 33 via the air inflow port 31. Both the air from the air inflow port 31 and the air jetted from the air jet port 21 flow out from the air outflow port 32 of the tubular member 30. Further, by the combination of the first embodiment, second embodiment, and third embodiment, the air that has flown out from the air outflow port 32 is supplied so as to be drawn toward the first surface 11 via the second surface 12 and the boundary portion 15, due to the Coanda effect.

REFERENCE SIGNS LIST

1 DRY MACHINING APPARATUS
2 SUPPORT DEVICE
3 CHAMBER DEVICE
4 HOB HEAD
5 HOB
10 RECEIVING SURFACE
11 FIRST SURFACE
12 SECOND SURFACE
13 THIRD SURFACE
14 BOUNDARY PORTION
15 BOUNDARY PORTION
15A FIRST LINE PORTION
15B SECOND LINE PORTION
16 PROTRUSION MEMBER
17 FOURTH SURFACE
18 CONVEX PORTION
19 CONCAVE PORTION
20 REMOVAL DEVICE
21 AIR JET PORT
22 AIR JET NOZZLE
23 INNER FLOW CHANNEL
23A REDUCING DIAMETER PORTION
23B EXPANDING DIAMETER PORTION
23C NARROWED PORTION
24 AIR INTRODUCTION PORT

25 SECOND AIR JET NOZZLE
26 SECOND PROTRUSION MEMBER
30 TUBULAR MEMBER
31 AIR INFLOW PORT
32 AIR OUTFLOW PORT
33 AIR FLOW CHANNEL
34 FIRST PROTRUSION MEMBER
AX1 CENTRAL AXIS
AX2 CENTRAL AXIS
C CHIPS
W WORKPIECE
θ1 ANGLE
θ2 ANGLE
θa PREDETERMINED ANGLE
θb PREDETERMINED ANGLE

The invention claimed is:

1. A dry machining apparatus, comprising:
   a tool that machines a workpiece;
   a receiving surface arranged below the tool and the workpiece, said receiving surface comprising
      a first surface that is arranged below the tool and the workpiece and which receives chips generated by the machining;
      a second surface that is arranged above the first surface; and
      a third surface that connects the first surface and the second surface;
   said apparatus comprising an air jet nozzle that has an air jet port which jets air toward a boundary portion between the second surface and the third surface from the second surface, said air jet nozzle supplying at least a part of the air jetted from the air jet port to the first surface.

2. The dry machining apparatus according to claim 1, wherein a dimension of the air jet port relative to a horizontal direction parallel to the first surface is larger than a dimension of the air jet port relative a vertical direction.

3. The dry machining apparatus according to claim 1, having:
   a convex portion provided at the boundary portion; or
   a concave portion provided at the boundary portion; or
   both a convex portion and a concave portion provided at the boundary portion.

4. The dry machining apparatus according to claim 1, wherein the boundary portion includes:
   a first line portion; and
   a second line portion that is arranged at a predetermined angle with respect to the first line portion.

5. The dry machining apparatus according to claim 1, wherein the air jet nozzle repeats:
   an operation of jetting the air from the air jet port for a first period; and
   an operation of stopping the jetting for a second period after elapse of the first period.

6. The dry machining apparatus according to claim 1, comprising:
   a tubular member that has at least a part thereof being arranged around the air jet nozzle, and has an air outflow port that supplies, to the first surface, air that has flown in from an air inflow port formed between the tubular member and an outer surface of the air jet nozzle, and air that has been jetted from the air jet port.

7. A dry machining apparatus, comprising:
   a tool that machines a workpiece;
   a first surface that is arranged below the tool and receives chips generated by the machining;
   an air jet nozzle that has an air jet port that jets air; and
   a tubular member that has at least a part thereof being arranged around the air jet nozzle, and has an air outflow port that supplies, to the first surface, air that has flown in from an air inflow port formed between the tubular member and an outer surface of the air jet nozzle, and air that has been jetted from the air jet port.

8. The dry machining apparatus according to claim 7, wherein an air flow channel between the outer surface of the air jet nozzle and an inner surface of the tubular member includes a reducing portion having cross sectional area that decreases toward the air outflow port from the air inflow port.

9. The dry machining apparatus according to claim 8, wherein the air flow channel of the tubular member includes an expanding portion having cross sectional area that increases toward the air outflow port.

10. The dry machining apparatus according to claim 7, having a first protrusion member that is provided at the air outflow port, and protrudes toward the center of the air outflow port.

11. The dry machining apparatus according to claim 1, wherein the air jet nozzle has an inner flow channel including:
    a narrowed portion;
    a reducing diameter portion having cross sectional area that decreases toward the narrowed portion; and
    an expanding diameter portion having cross sectional area that increases toward the air jet port from the narrowed portion.

12. A dry machining apparatus, comprising:
    a tool that machines a workpiece;
    a first surface that is arranged below the tool and receives chips generated by the machining; and
    an air jet nozzle that:
       has:
          an air jet port that jets air; and
          an inner flow channel including:
             a narrowed portion;
             a reducing diameter portion having cross sectional area that decreases toward the narrowed portion; and
             an expanding diameter portion having cross sectional area that increases toward the air jet port from the narrowed portion; and
    the air jet nozzle supplies, to the first surface, at least a part of the air that has flown through the inner flow channel and has been jetted from the air jet port.

13. The dry machining apparatus according to claim 12, including a second air jet nozzle that is arranged lower than the air jet nozzle, and that jets air having pressure lower than pressure of air jetted from the air jet port of the air jet nozzle.

14. The dry machining apparatus according to claim 12, having a protrusion member that is provided at the air jet port, and protrudes toward the center of the air jet port.

* * * * *